US006310754B1

(12) United States Patent
Busato

(10) Patent No.: US 6,310,754 B1
(45) Date of Patent: Oct. 30, 2001

(54) CONTROL ACCURACY OF A PULSE-OPERATED ELECTROMECHANICAL DEVICE

(75) Inventor: Murray Fancis Busato, Chatham (CA)

(73) Assignee: Siemens Canada Limited, Mississauga (CA)

( * ) Notice: Subject to any disclaimer, the term of this patent is extended or adjusted under 35 U.S.C. 154(b) by 0 days.

(21) Appl. No.: 09/585,448

(22) Filed: Jun. 2, 2000

Related U.S. Application Data

(62) Division of application No. 08/902,885, filed on Jul. 30, 1997, now Pat. No. 6,102,364.

(51) Int. Cl.[7] ............................................. F16K 31/02
(52) U.S. Cl. ................................... 361/187; 251/129.05
(58) Field of Search ................................ 361/153, 154, 361/170, 171, 182, 186, 187, 160; 251/129.01, 129.05, 129.06, 129.07, 129.08

(56) References Cited

U.S. PATENT DOCUMENTS 4,766,921  8/1988  Williams .................................. 137/1
6,102,364  8/2000  Busato ............................ 251/129.05

FOREIGN PATENT DOCUMENTS 43 16 759 A   11/1994  (DE) ................................ G05D/7/06
43 29 917 A    3/1995  (DE) ................................ G05F/1/46

OTHER PUBLICATIONS

Japanese Abstract, Publication No. 01015564, July 7, 1987.
International Search Report, October 16, 1998.

Primary Examiner—Ronald W. Leja

(57) ABSTRACT

A control for controlling an output of a system of an automotive vehicle having an electric-operated control device that controls an output of a system of the automotive vehicle in accordance with an electric control signal comprising a waveform comprising voltage pulses applied to the device. An electric control, including a processor, for developing the electric control signal from a primary control signal and a secondary control signal. The processor causes the secondary control signal to selectively interact with the primary control signal in developing the electric control signal such that at certain times, the electric control signal is developed from the primary control signal alone, and at certain other times, the electric control signal is developed by interaction of the secondary control signal with the primary control signal.

35 Claims, 9 Drawing Sheets

CONTROL ACCURACY OF A PULSE-OPERATED ELECTROMECHANICAL DEVICE

This a divisional of application Ser. No. 08/902,885 filed on Jul. 30, 1997, now U.S. Pat. No. 6,102,364.

FIELD OF THE INVENTION

This invention relates generally to pulse-operated electromechanical devices. While generic principles of the invention are applicable to a variety of such devices, application of the principles to certain fluid control devices, such as solenoid-actuated fluid valves for example, provides important new capabilities for fluid control strategies.

BACKGROUND OF THE INVENTION

A known control strategy for an electromechanical device comprises the controlled delivery of electric pulses to an electromechanical actuator of the device. One example of such a control strategy comprises the delivery of a pulse-width-modulated (PWM) waveform to a device. Such a control strategy has heretofore been proposed for the control of certain solenoid-actuated devices used in motor vehicles that are powered by internal combustion engines. Examples of such devices include emission control valves like electric exhaust gas recirculation (EEGR) valves and canister purge solenoid (CPS) valves. The ensuing disclosure of the inventive principles will be presented in connection with control of a CPS valve in an on-board evaporative emission control system for an automotive vehicle.

A known on-board evaporative emission control system comprises a vapor collection canister that collects volatile fuel vapors generated in the headspace of the fuel tank by the volatilization of liquid fuel in the tank and a CPS valve for periodically purging collected vapors to an intake manifold of the engine. The CPS valve comprises a solenoid actuator that is under the control of a microprocessor-based engine management system.

During conditions conducive to purging as determined by the engine management system on the basis of various inputs to it, evaporative emission space that is cooperatively defined by the tank headspace and the canister is purged to the engine intake manifold through the CPS valve, which is fluid-connected between the canister and the engine intake manifold. The CPS valve is opened by a signal from the engine management computer in an amount that allows intake manifold vacuum to draw volatile fuel vapors from the canister for entrainment with the combustible mixture passing into the engine's combustion chamber space at a rate consistent with engine operation to provide both acceptable vehicle driveability and an acceptable level of exhaust emissions.

A known CPS valve comprises a movable valve element that is resiliently biased by a compression spring against a valve seat to close the valve to flow when no electric current is being delivered to the solenoid. As electric current begins to be increasingly applied to the solenoid, increasing electromagnetic force acts in a sense tending to unseat the valve element and thereby open the valve to fluid flow. This electromagnetic force must overcome various forces acting on the mechanical mechanism before the valve element can begin to unseat, including overcoming both whatever static friction (stiction) is present between the valve element and the seat, as well as the opposing spring bias force. Once the valve element has unseated, the valve element/valve seat geometry also plays a role in defining the functional relationship of fluid flow rate through the valve to electric current supplied to the solenoid coil. Furthermore, the extent to which a given valve possesses hysteresis will also be reflected in the functional relationship.

When the valve element comprises a tapered pintle that is selectively positioned axially within a circular orifice which is circumscribed by the valve seat, a well defined flow rate vs. pintle position characteristic can be obtained. However, certain geometric factors present at the valve element/valve seat interface may prevent this characteristic from becoming effective until the valve element has unseated a certain minimum distance from the valve seat. Accordingly, each graph plot of fluid flow rate through the valve vs. electric current supplied to the solenoid coil may be considered to comprise distinct spans: a short initial span that occurs between valve closed position and a certain minimum valve opening: and a more extensive subsequent span that occurs beyond a certain minimum valve opening.

One specific type of CPS valve comprises a linear solenoid and a linear compression spring that is increasingly compressed as the valve increasingly opens. It is sometimes referred to as a linear solenoid purge valve. Such a valve can provide certain desirable characteristics for flow control. By itself, a linear solenoid possesses a force vs. electric current characteristic that is basically linear over a certain range of current. When a linear solenoid is incorporated in an electromechanical device, the overall electromechanical mechanism possesses an output vs. electric current characteristic that is a function of not just the solenoid, but also the mechanical mechanism to which the solenoid force is applied. As a consequence then, the output vs. electric current characteristic of the overall device is somewhat modified from that of the linear solenoid alone, and the same is true in the case of a PPS valve.

While a CPS valve that incorporates both a linear solenoid and a tapered pintle valve element which is selectively positionable axially within a circular orifice that is circumscribed by the valve seat can exhibit a desired fluid flow rate vs. pintle position characteristic, such characteristic may not become effective until after the pintle has opened a certain minimum amount because of geometric factors at the pintle/seat interface, as noted earlier. Accordingly, each graph plot of fluid flow rate through the valve vs. electric current applied to the solenoid coil may be considered to comprises the spans referred to above, namely, a short initial span that occurs between valve closed position and a certain minimum valve opening, and a more extensive subsequent span that occurs beyond a certain minimum valve opening.

Generally speaking, a linear solenoid purge valve that is not pressure compensated is graphically characterized by a series of graph plots of fluid flow rate vs. electric current, each of which is correlated to a particular pressure differential across the valve. Each graph plot may be characterized by the aforementioned short initial span and the more extensive subsequent span. Within the latter span of each graph plot, one especially desirable attribute is a substantially constant relationship between incremental change in an electric control current applied to the solenoid and incremental change in fluid flow rate through the valve. Within the former span, incremental change in fluid flow rate through the valve may bear a substantially different relationship to incremental change in an electric control current applied to the solenoid, once again because of the valve element/valve seat interface geometry.

In one such linear solenoid purge valve, a certain minimum electric current is required before the valve begins to open. As the valve begins to open, each fluid flow rate vs. electric current graph plot follows the relatively short initial span where a small incremental change in electric current will result in an incremental change in flow that is much larger than the incremental change that would result were the valve instead operating within the span where the valve has opened beyond the certain minimum and incremental change in flow through the valve bears a substantially constant relationship to incremental change in electric current.

Electric current to the solenoid coil can be delivered in various ways. One known way is by applying a pulse width modulated D.C. voltage across the solenoid coil. In choosing the pulse frequency of the applied voltage, consideration should be given to the frequency response characteristic of the combined solenoid and valve mechanism. If a pulse frequency that is well within the frequency response range of the combined solenoid and valve mechanism is used, the mechanism will faithfully track the pulse width signal. On the other hand, if a pulse frequency that is well beyond the frequency response range of the combined solenoid and valve mechanism is used, the mechanism will be positioned according to the time average of the applied voltage pulses. The latter technique may be preferred over the former because the valve mechanism will not reciprocate at the higher frequency pulse width modulated waveform, but rather will assume a position corresponding to the time averaged current flow in the solenoid coil. Under the former technique, the mechanism would by contrast experience significant reciprocation as it tracks the lower frequency waveform.

While PWM control may therefore be a desirable technique to control a solenoid-actuated valve over a range where the ratio of incremental change in fluid flow rate to incremental change in average solenoid current is substantially constant, accurate control may be more difficult to achieve over a range where such a characteristic does not exist.

Accordingly, a need exists for further device in certain aspects of control strategy for pulse-operated electromechanical devices such as fluid valves. Devices are particularly significant for automotive vehicle emission control valves because such valves may be required to perform under diverse vehicle operating conditions. For a CPS valve, purging of volatile fuel vapor to the intake manifold when the engine is idling may be quite difficult to accurately control.

SUMMARY OF THE INVENTION

The present invention is directed to solutions that improve the ability to accurately control pulse-operated electric devices which are subject to certain phenomena that make accurate control more difficult. In the case of the PPS valve of the example to be described in detail herein, the inventive principles are especially advantageous in accomplishing improved control of flow through the valve despite the presence of certain electromechanical characteristics that make accurate control more difficult to achieve.

One general aspect of the present invention relates to a device in control of a pulse-operated electric control device, wherein the control selectively utilizes high-frequency and low-frequency control signals in a new and unique way.

As applied to an electric-actuated fluid valve, a more specific aspect of the invention relates to a control system and strategy wherein a processor cause a secondary control signal to selectively interact with a primary control signal in developing an electric control signal that operates the valve such that whenever the valve is to operate in a first fluid flow range, the electric control signal is developed from the primary control signal alone, and whenever the valve is to operate in a second fluid flow range, the electric control signal is developed by interaction of-the secondary control signal with the primary control signal.

One specific example of such interaction comprises using a relatively lower frequency pulse waveform for the secondary control signal and a relatively higher frequency pulse waveform for the primary control signal wherein the relatively higher frequency primary pulse waveform is selectively gated by the relatively lower frequency secondary pulse waveform. The relative higher frequency primary pulse waveform is itself duty-cycle modulated to effectuate control over the valve.

As applied to the linear solenoid purge valve of the herein-disclosed embodiment, the invention supplies a high-frequency pulse width modulated voltage waveform across the solenoid coil to cause the valve to operate within a generally linear span where incremental change in fluid flow rate through the valve bears a substantially constant relationship to a given incremental change in average electric current through the coil. The average current through the coil is correlated with the degree of modulation of the PWM voltage waveform so that modulation of the waveform will control the fluid flow. During this mode of operation, the secondary control signal does not interact with the primary control signal.

To control the valve in a different span, such as one where the relationship between a given incremental change in average electric current in the coil and the resulting incremental change in fluid flow does not exhibit the same linearity as in the aforementioned generally linear span, the high-frequency PWM voltage waveform is further modulated by a low-frequency signal. During this mode of operation, the secondary control signal does interact with the primary control signal, for example in effect modulating the primary control signal. When applied to the solenoid coil, such a further modulated PWM waveform will operate the valve to positions that are a function of the low-frequency signal within a range of positions having a limit established by the high-frequency PWM waveform by itself. The range of modulation of the low-frequency control signal endows the control with the ability to more accurately control the fluid flow through the valve when the valve is to operate in such a different span.

The foregoing, along with additional features, and other advantages and benefits of the invention, will be seen in the ensuing description and claims which are accompanied by drawings. The drawings disclose a preferred embodiment of the invention according to the best mode contemplated at this time for carrying out the invention.

DESCRIPTION OF THE PREFERRED EMBODIMENT

Figure 1:
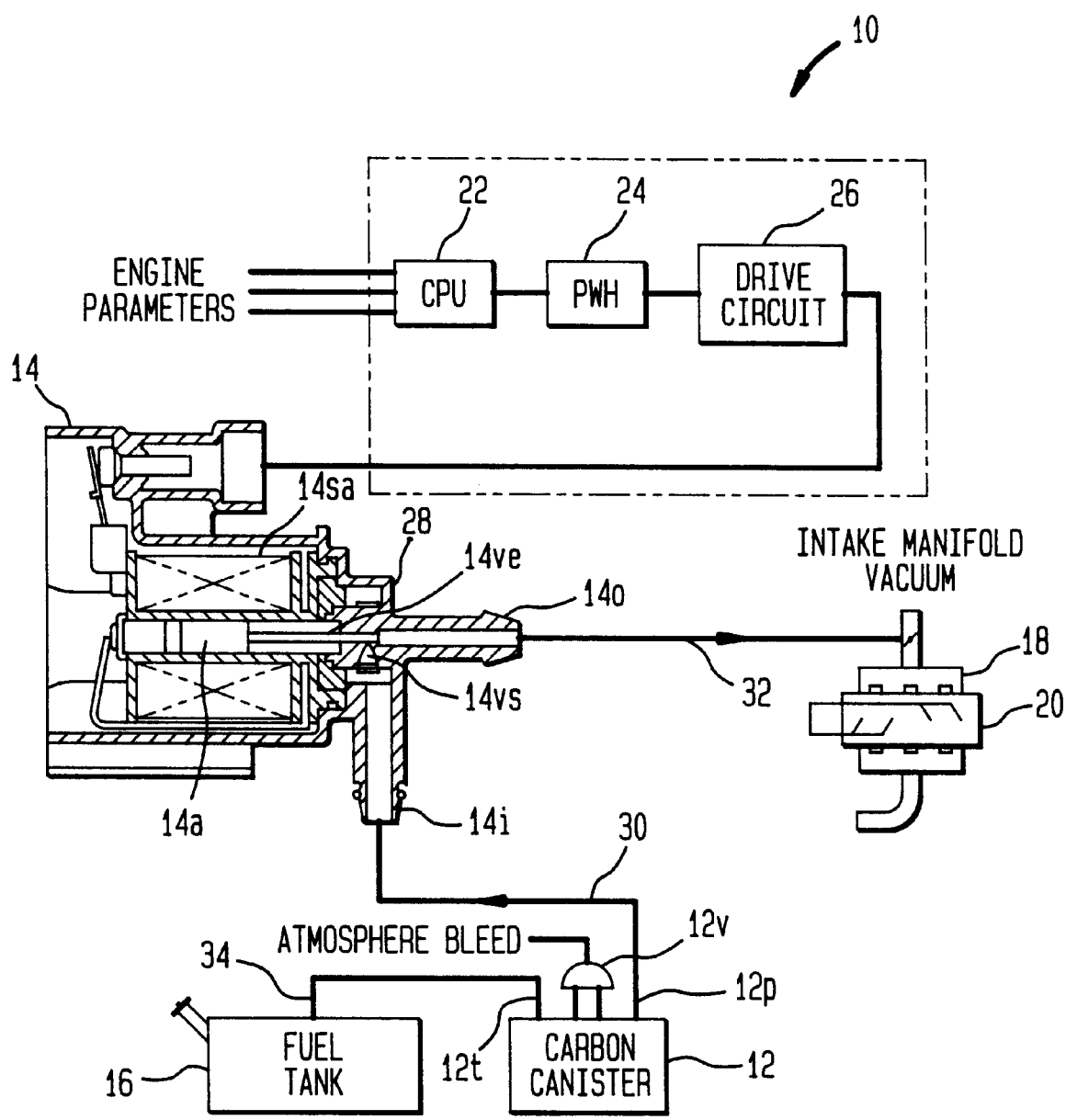
FIG. 1 is a schematic diagram of an on-board evaporative emission control system, including an enlarged longitudinal cross-sectional view through a canister purge solenoid valve.

FIG. 1 shows an evaporative emission control system 10 of a motor vehicle comprising a vapor collection canister (carbon canister) 12 and a canister purge solenoid (CPS) valve 14 connected in series between a fuel tank 16 and an intake manifold 18 of an internal combustion engine 20 in a known fashion. An engine management computer 22 supplies a valve control signal as an input to a pulse width modulation (PWM) circuit 24 to create a pulse width modulated signal which is amplified by a drive circuit 26 and applied to electric terminals 14et of valve 14.

Valve 14 comprises a housing 28 having an inlet port 14i that is fluid-coupled via a conduit 30 with a purge port 12p of canister 12 and an outlet port 14o that is fluid-coupled via a conduit 32 with intake manifold 18. A conduit 34 communicates a canister tank port 12t to headspace of fuel tank 16. An operating mechanism comprising a solenoid actuator 14sa is disposed within housing 28 for opening and closing an internal passage that extends between ports 14i and 14o. The mechanism includes a bias spring 14bs that acts to urge a valve element 14ve closed against a valve seat 14vs for closing the internal passage to flow. When the solenoid actuator is progressively energized by engine management computer 22, electromagnetic force is applied to an armature 14a in opposition to the bias spring force to unseat valve element 14ve from valve seat 14vs and thus open the internal passage so that flow can occur between ports 26 and 30.

Canister 12 is also seen to comprise a vent port 12v via which the evaporative emission space where the fuel vapors are contained is vented to atmosphere. Such venting may be via an atmospheric vent valve (not shown) that is operated closed at certain times, such as during OBDII testing.

Figure 2:
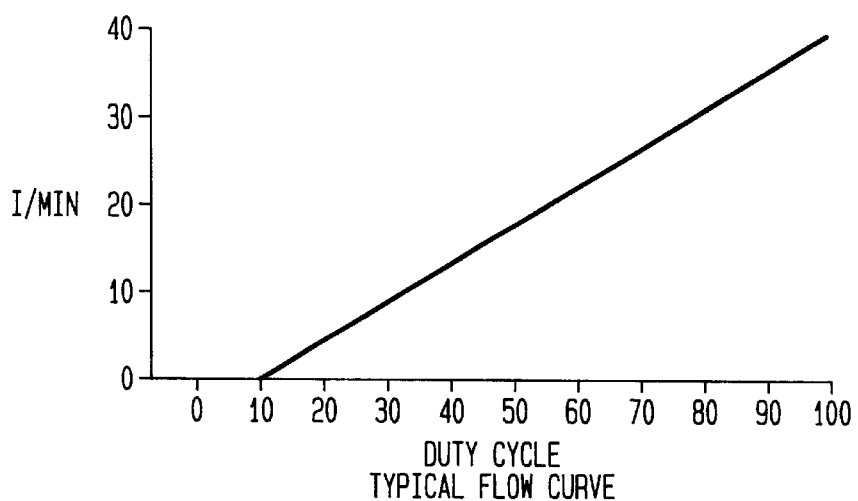
FIG. 2 is a representative graph plot related to FIG. 1.

FIG. 2 depicts a representative control characteristic for valve 14 wherein fluid flow rate through the valve is related to the duty cycle of a pulse width modulated voltage that is applied across terminals 14et. A certain minimum duty cycle, about 10% in the example, is required before the valve begins to open. As the duty cycle increases beyond 10%, the flow rate bears a generally straight line relationship to duty cycle. At 100% duty cycle a constant D.C. voltage is applied across terminals 14et. The frequency of the pulse waveform that accomplishes this type of operation is relatively low, a representative frequency being within a range from about 5 Hz to about 20 Hz. For valve mechanisms whose frequency response extends beyond such a range, the mechanism will experience significant reciprocal motion as it follows the pulse waveform.

If the valve is not pressure-regulated, flow rate will also be a function of the pressure differential across the valve ports. Temperature and voltage variations may also influence the relationship.

Figure 3:
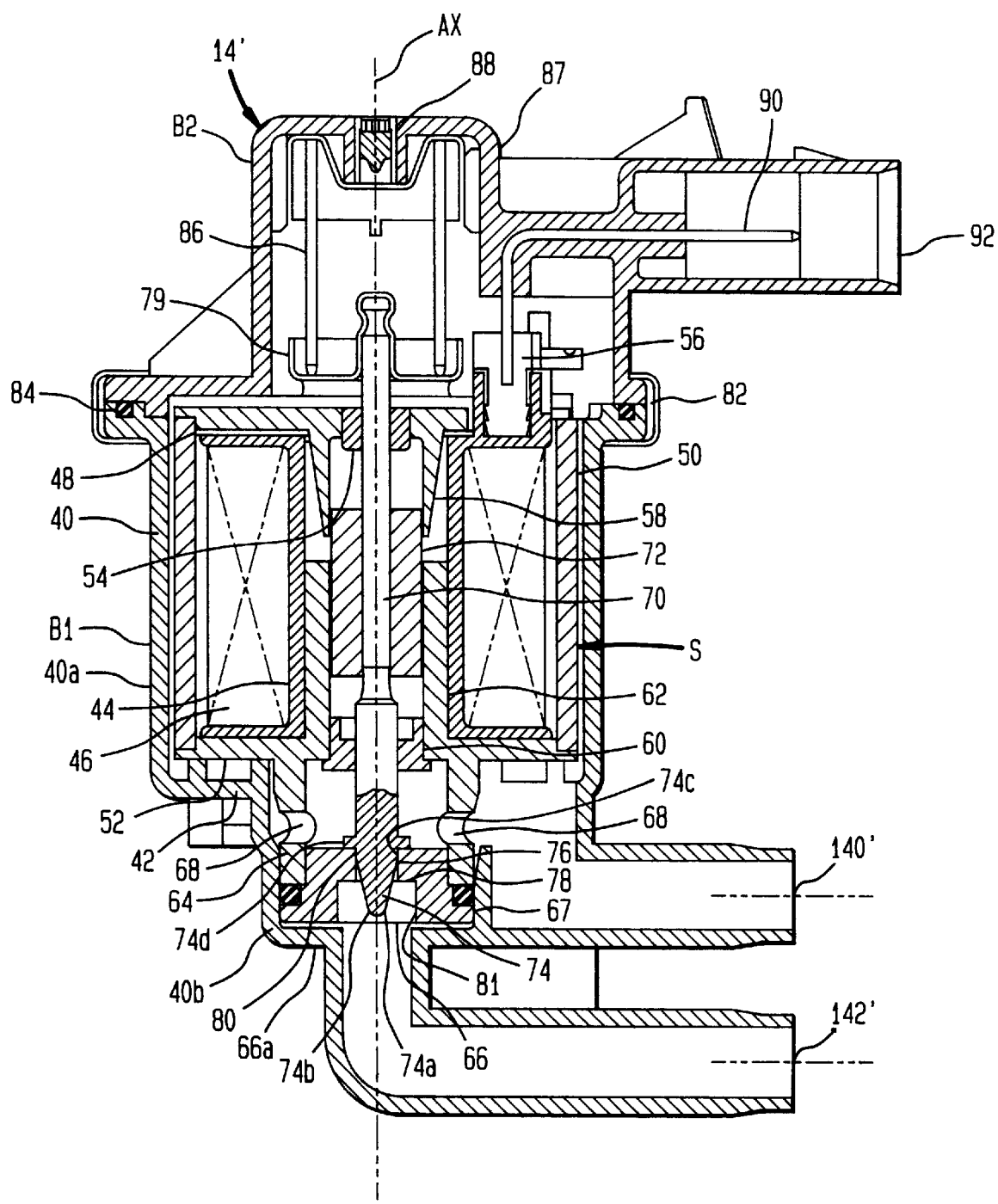
FIG. 3 is a longitudinal cross-sectional view through another canister purge solenoid valve.

It is known that the use of a linear solenoid can improve control accuracy, and FIG. 3 shows an example of a linear solenoid purge valve 14', certain parts of which correspond to parts of valve 14 already mentioned, and they will be designated by corresponding primed reference numerals.

Valve 14' comprises a two-piece body B1, B2 having an inlet port 14i' and an outlet port 14o'. Valve 14' has a longitudinal axis AX, and body piece B1 comprises a cylindrical side wall 40 that is coaxial with axis AX and that is open at its upper axial end where it is in assembly with body piece B2. Side wall 40 comprises upper and lower side wall portions 40A, 40B joined by a shoulder 42; the former side wall portion is fully cylindrical while the latter is cylindrical except in the region where it is radially intercepted by port 14o'. Port 14i' is in the shape of an elbow that extends from the lower axial end of side wall 40. By itself, body piece B1 is enclosed except for its open upper axial end and the two ports 14o' and 14i'.

A linear solenoid S is disposed in body piece B1, having been introduced through the open upper end of body piece B1 during fabrication of the valve. The solenoid comprises a bobbin 44, magnet wire wound on bobbin 44 to form a bobbin-mounted electromagnetic coil 46, and stator structure associated with the bobbin-coil. This stator structure comprises an upper stator end piece 48 disposed at the upper end of the bobbin-mounted coil, a cylindrical side stator piece 50 disposed circumferentially around the outside of the bobbin-mounted coil, and a lower stator end piece 52 disposed at the lower end of the bobbin-mounted coil.

Upper stator end piece 48 includes a flat circular disk portion whose outer perimeter fits to the upper end of side piece 50 and that contains a hole into which a bushing 54 is pressed so as to be coaxial with axis AX. The disk portion also contains another hole to allow for upward passage of a pair of bobbin-mounted electrical terminals 56 to which ends of magnet wire 46 are joined. Piece 48 further comprises a cylindrical neck 58 that extends downward from the disk portion a certain distance into a central through-hole in bobbin 44 that is co-axial with axis AX. The inner surface of neck 58 is cylindrical while its outer surface is frusto-conical so as to provide a radial thickness that has a progressively diminishing taper as the neck extends into the bobbin through-hole.

Lower stator end piece 52 includes a flat circular disk portion whose outer perimeter fits to the lower end of side piece 50 and that contains a hole into which a bushing 60 is pressed so as to be coaxial with axis AX. Piece 52 further comprises an upper cylindrical neck 62 that extends upwardly from the disk portion a certain distance into the central through-hole in bobbin 44 and that is co-axial with axis AX. Neck 62 has a uniform radial thickness. Piece 52 still further comprises a lower cylindrical neck 64 that extends downward from the disk portion a certain distance so that its lowermost end fits closely within lower side wall portion 40B. A valve seat element 66 is necked to press-fit into the open lower end of neck 64 and is sealed to the inside of wall portion 40B by an O-ring 67. Above the lowermost end that fits to side wall 40, neck 64 contains several through-holes 68 that provide for communication between port 14o' and the space disposed above seat element 66 and bounded by neck 64. Side wall 40 allows this communication by not restricting through-holes 68.

Bushings 54 and 60 serve to guide a valve shaft 70 for linear travel motion along axis AX. A central region of shaft 70 is slightly enlarged for press-fit of a tubular armature 72 thereto. The lower end of shaft 70 comprises a valve 74 that coacts with valve seat element 66. Valve 74 comprises a head, integrally formed with shaft 70 and having the general shape of a tapered pintle, comprising a rounded tip 74A, a frustoconical tapered section 74B extending from tip 74A, a grooved cylindrical section 74C extending from section 74B, and an integral back-up flange 74D that in part defines the upper axial end of the groove of section 74C. An O-ring type seal 76 of suitable fuel-resistant elastomeric material is disposed in the groove of section 74c.

Seat element 66 comprises an inwardly directed shoulder 66A that contains a portion of a through-hole that extends axially through the seat element. This portion of the through-hole comprises a straight cylindrical section 78 and a frustoconical seat surface 80 that extends from the upper end of section 78 and is open to the interior space bounded by neck 64. The remainder of the through-hole axially below section 78 is designated by the reference numeral 81.

The upper end of shaft 70 protrudes a distance above bushing 54 and is shaped to provide for attachment of a spring seat 79 thereto. With piece B2 being attached to piece B1 by a clinch ring 82 which grips confronting, mated flanges to sandwich a seal 84 between them, a helical coiled linear compression spring 86 is captured between seat 79 and another spring seat 87 that is received in a suitably shaped pocket of piece B2. A calibration screw 88 is threaded into a hole in the end wall of this pocket coaxial with axis AX, and it is externally accessible by a suitable turning tool (not shown) for setting the extent to which spring seat 87 is positioned axially relative to the pocket. Increasingly threading screw 88 into the hole increasingly moves seat 87 toward spring seat 79, increasingly compressing spring 86 in the process. Terminals 56 are also joined with terminals 90 mounted in piece B2 to form an electrical connector 92 for mating engagement with another connector (not shown) that connects to drive circuit 26.

In the valve closed position shown in FIG. 3, a rounded surface portion of seal 76 has circumferentially continuous sealing contact with seat surface 80 so that the valve closes the flow path between ports 14o' and 14i'. In this position the upper portion of armature 72 axially overlaps the air gap that exists between the upper end of neck 62 and the lower end of neck 58, but slight radial clearance exists so that armature 72 does not actually touch the necks, thereby avoiding magnetic shorting.

Generally speaking, the degree of valve opening depends on the magnitude of electric current flow through the solenoid coil 46 so that the purge flow through the valve is effectively controlled by controlling the electric current flow through the coil. As the magnitude of electric current flow progressively increases from zero, it reaches a value sufficient to break whatever stiction exists between the seated O-ring 76 and seat surface 80. At that point the valve mechanism begins to open against the opposing force of spring 86. Valve opening commences as soon as O-ring seal 76 loses contact with seat surface 80.

Depending on the specific geometric relationships that are present between the valve pintle, its O-ring seal, and the angle of the valve seat surface, a certain initial axial travel of the pintle that unseats O-ring seal 76 from seat surface 80 may have to occur before tapered section 74B can become effective by itself to set the effective flow area through the seat element through-hole. In other words, it is only after the valve has traveled more than some initial minimum travel distance that the tapered section can become effective by itself to control the area open to flow. Beyond this initial minimum, the open area progressively increases as the pintle is increasingly positioned away from the seat element with the profiles of the tapered section 74B and of the rounded tip 74A in succession establishing the size of the open area as the pintle increasingly moves away from seat element 66.

A representative graph plot of fluid flow rate vs. electric current reveals three distinct spans: a first span where current increases without any valve opening; a second span where the valve begins to open but the tapered section 74B is not yet fully effective to control the flow by itself; and a third span where the valve has opened sufficiently to allow section 74B, and finally tip 74A, to control the flow. The second span may be characterized by a relationship wherein a small incremental change in average electric current in solenoid S causes an incremental change in fluid flow rate that is substantially different from the incremental change results when the valve operates instead within the third span. One aspect of the present invention relates to improving the control of flow when the valve is to operate within this second span.

Figure 4:
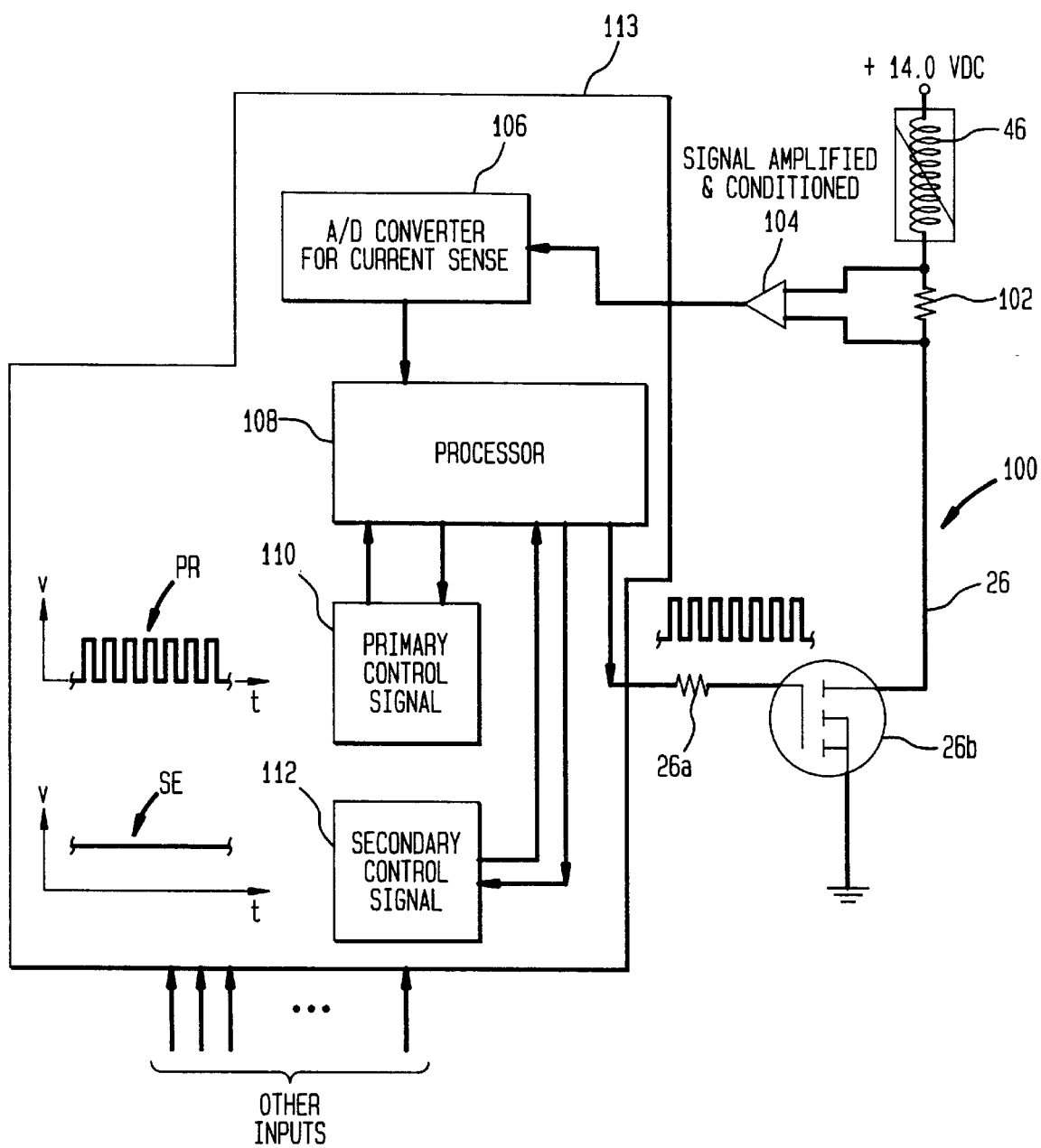
FIG. 4 is a schematic diagram of an electric control circuit associated with the valve of FIG. 3, illustrating one aspect of control strategy in accordance with the inventive principles.

FIG. 4 illustrates in block diagram form a representative electric circuit 100 for operating valve 14'. Circuit 100 comprises: a resistor 102 for sensing current flow through the coil of solenoid S; a signal conditioning and amplifying circuit 104 associated with resistor 102; an analog-to-digital converter circuit 106 for converting the analog signal output of circuit 104 into an equivalent digital signal; a processor 108 that acts upon both a primary control signal 110 and a secondary control signal 112. Processor 108 processes the primary and secondary control signals to develop a control output signal that is supplied as an input to driver circuit 26 which is shown to comprise a coupling resistor 26A and a solid state device such as a FET 26B. The particular exemplary embodiment depicted by FIG. 4 further shows that analog-to-digital converter circuit 106, processor 108, and the sources of the primary and secondary control signals 110, 112 are contained in a microcontroller 113.

Coil 46 of solenoid S, resistor 102, and a principal controlled conduction path of solid state device 26B are connected in a series circuit across an available D.C. power supply of an automotive vehicle, preferably one whose voltage is well regulated. Electric current flow through this series circuit is controlled by driver 26B in accordance with the control output signal coupled from processor 108 via resistor 26A to a control input of device 26B. As electric current passes through resistor 102 and the controlled conduction path of device 26B, the voltage drop across resistor 102 is supplied as an input to signal conditioning and amplifying circuit 104 where it is developed into an equivalent analog signal for input to analog-to-digital converter circuit 106. The latter circuit converts the analog signal into an equivalent digital signal which is supplied to processor 108 as a tertiary control signal representing the actual electric current flow through coil 46.

A purpose of supplying a tertiary control signal representative of electric current flow through the solenoid coil is to endow circuit 100 with a feedback loop that serves to compensate for certain environmentally induced changes that could otherwise impair control accuracy. For example, the feedback loop automatically regulates the current flow through coil 46 such that the influence of changes in variables such as D.C. supply voltage, coil self-heating, and ambient temperature is essentially negated, thereby enabling the valve to operate to a desired position commanded by circuit 100 substantially free of such influences.

In the representative exemplary circuit of FIG. 4, microcontroller 113 is seen to receive various inputs representing diverse variables related to engine operation. By way of example, such inputs may comprises intake manifold vacuum, engine speed, and deviation of the combustion process in the engine from stoichiometric, as measured by an oxygen sensor in the engine exhaust. Microcontroller 113 may be programmed with suitable algorithms to evaluate whatever of any input variables are appropriate for development of proper primary and secondary control signals for processing by processor 108.

FIG. 4 shows by way of example that the sources for the primary and secondary control signals are self-contained within microcontroller 113. In such a configuration, the primary and secondary signals are generated as processor 108 executes certain algorithms that utilize those input variables that are appropriate for development of proper primary and secondary control signals. The primary and secondary control signals are then acted upon by certain other algorithms of processor 108 to ultimately create the electric control signal that operates valve 14'.

Various signal waveforms show in FIG. 4 portray an operating condition where an exemplary primary control signal appears as a pulse width modulated voltage waveform signal PR, and the secondary control signal SE is in a condition that is recognized by processor 108 so as to cause the output control signal supplied from the processor to driver circuit 26 to replicate the pulse width modulated primary control signal. This in turn causes a corresponding average D.C. electric current flow through the principal controlled conduction path of device 26B and hence through solenoid coil 46. The replicated signal has a frequency (200 hz in the example) chosen to be sufficiently high in relation to the frequency response of the combined solenoid and valve mechanism that the valve is incapable of tracking the pulse width modulated waveform. Consequently, once stiction has been overcome, the valve operates to a position that corresponds to the time averaged electric current flow in the solenoid coil. As the duty cycle of the replicated PWM waveform changes in accordance with change in the primary control signal, the time averaged D.C. electric current in the solenoid coil correspondingly changes, to in turn correspondingly change the position of the valve mechanism, and hence the valve pintle.

Figure 5:
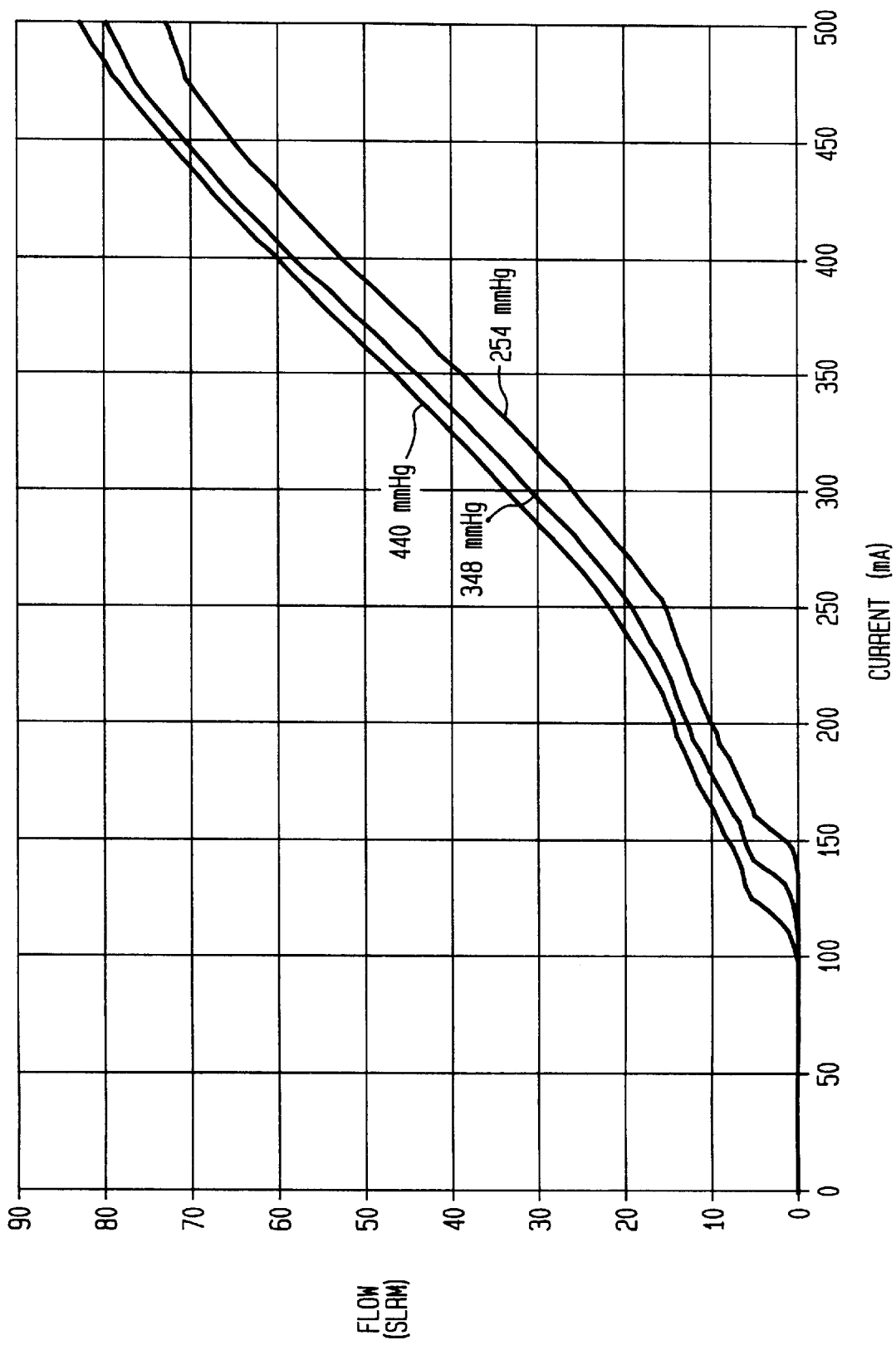
FIG. 5 is a series of graph plots useful in explaining the inventive principles in relation to FIG. 4.

FIG. 5 shows three representative graph plots of fluid flow rate through the valve vs. time-averaged D.C. current flow in the solenoid coil. Each graph plot corresponds to a different value of intake manifold vacuum as indicated in FIG. 5. All of the plots however have generally similar shapes. Each shows that a certain minimum current must flow in the solenoid coil before the valve begins to open. This span where the valve remains closed corresponds to the first span referred to above. FIG. 5 shows that about 100 milliamps of current flow is required to open the valve when intake manifold vacuum is 440 mm Hg, about 115 milliamps when intake manifold vacuum is 348 mm Hg, and about 140 milliamps when intake manifold vacuum is 254 mm Hg.

Once the valve has started to open, the fluid flow rate begins to increase with increasing current. An initial span of valve opening corresponds to the second span mentioned above. For intake manifold vacuum of 440 mg Hg, such initial span of valve opening ends at approximately 127 milliamp average solenoid current; for intake manifold vacuum of 348 mg Hg, the span ends at approximately 143 milliamps average solenoid current; and for intake manifold vacuum of 254 mg Hg, the span ends at approximately 162 milliamps average solenoid current. It is to be further observed that each of these spans ends when the fluid flow rate is approximately 5 SLPM, a rate which corresponds to the valve pintle having been sufficiently displaced from the seat members bring tapered section 74B into full control of the effective flow area. Each graph plot span beyond the approximately 5 SLPM flow rate corresponds to the third span referred to earlier.

Over a flow rate span from approximately 1 SLPM to approximately 5 SLPM, each of the graph plots has a substantially similar slope characterized by certain incremental change in average electric current causing certain incremental change in fluid flow rate. For flow rates greater than approximately 5 SLPM, each of the graph plots exhibits, for a given incremental change in average current, an incremental change in fluid flow rate that is less than the incremental change in fluid flow rate that occurs in response to the same given incremental change in average current when the fluid flow rate is below 5 SLPM. In the examples of FIG. 5, fluid flow rates from approximately 5 SLPM to approximately 15 SLPM show generally identical incremental change in flow rate for a given incremental change in average current. Fluid flow rates from approximately 15 SLPM to approximately 70.5 SLPM show generally identical incremental change in flow rate for a given incremental change in average current, but, for a given incremental change in average current, these generally identical incremental changes in fluid flow rate are slightly larger than the incremental changes in fluid flow rate over the 5 SLPM to 15 SLPM range. However for a given incremental change in average current, incremental change in fluid flow rates below 5 SLPM are considerably larger than those for fluid flow rates above 5 SLPM. And it is to be remembered that the pintle profile is a factor in defining the specific graph plot shapes.

Because the slopes of the graph plots are noticeably greater in the span from 0 SLPM to 5 SLPM fluid flow rate than in the span beyond 5 SLPM, control accuracy is more difficult to attain for such slower flows. One aspect of the present invention relates to improving the control accuracy in these spans of slower flow. The control strategy is portrayed by the representative signal waveforms of FIG. 6 wherein the secondary control signal now interacts with the primary control signal via processor 108 to develop the signal waveform that is applied to driver circuit 26 by the processor.

Figure 6:
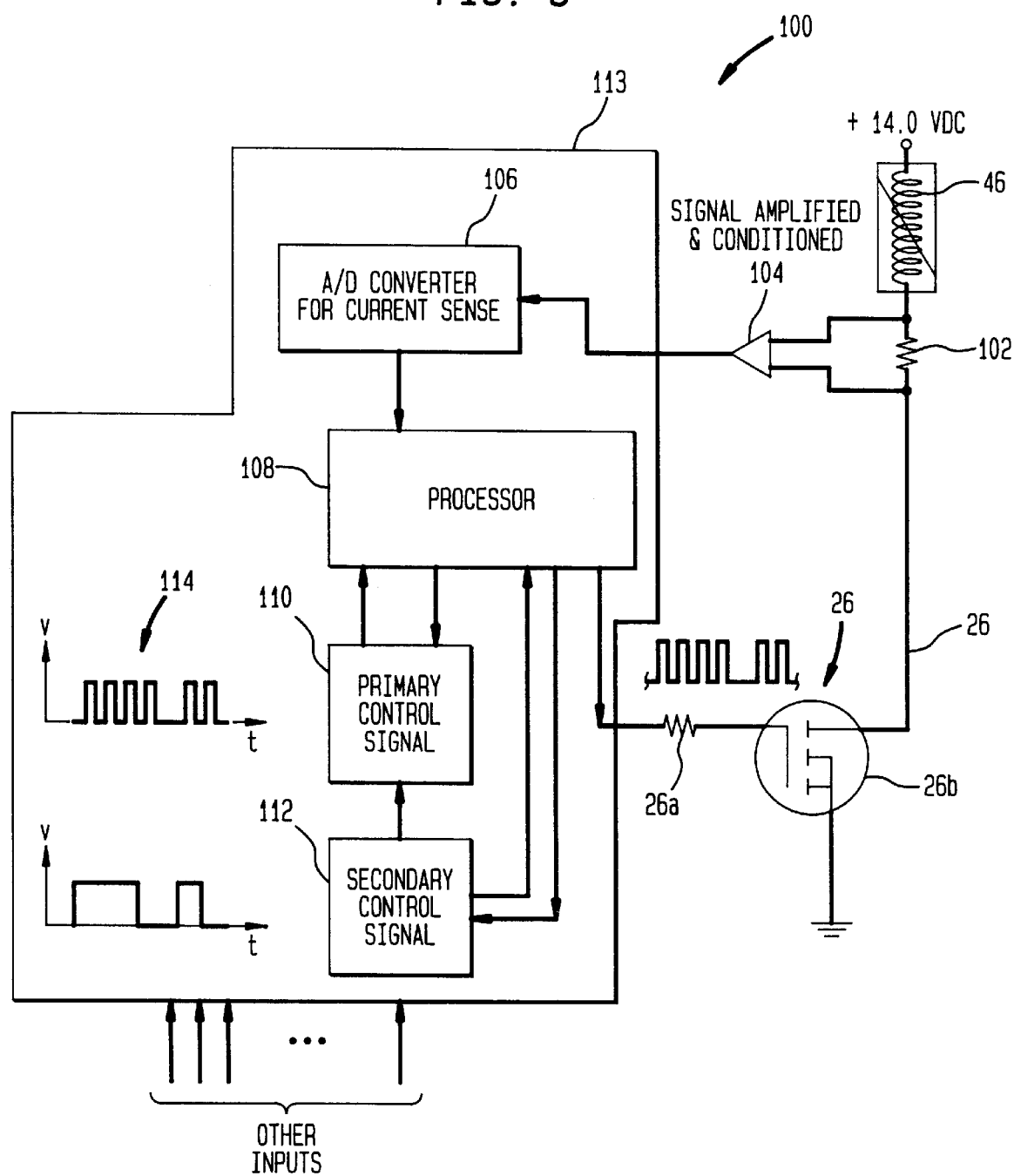
FIG. 6 is a schematic diagram similar to FIG. 4, but illustrating another aspect of control strategy in accordance with the inventive principles.

FIG. 6 shows circuit 100 with respective waveforms from primary control circuit 112 and secondary control circuit 114. The waveform from primary control circuit 112 comprises a relatively higher frequency PWM waveform (200 hz in the example illustrated) while the waveform from secondary control circuit 114 comprises a relatively lower frequency waveform (8 hz for example) which may itself even be pulse width modulated. The secondary control signal is thus in essence used to modulate the primary control signal. Stated another way, circuit 100 effectively functions to gate the primary control signal waveform to driver circuit 26 in accordance with the state of the secondary control signal waveform. In the example illustrated, the primary control signal waveform is gated through to circuit 26 only during the "on" time of the secondary control signal waveform, i.e. when the secondary control signal waveform is high. Stated still another way, the primary control signal waveform is blanked during the "off" time of the secondary control circuit output waveform, i.e. whenever the secondary control circuit output waveform is low.

Thus one should appreciate that generic principles of the invention contemplate that the processor causes the secondary control signal to selectively interact with the primary control signal in developing the electric control signal that operates the valve such that whenever the valve is to operate in a first fluid flow range, the electric control signal is developed from the primary control signal alone, and whenever the valve is to operate in a second fluid flow range, the electric control signal is developed by interaction of the secondary control signal with the primary control signal.

When the secondary control signal is called upon to interact with the primary control signal waveform in the manner depicted by the waveforms of FIG. 6, valve 14' responds much like a low-frequency duty cycle CPS valve, but having the maximum flow rate determined by the primary control circuit output waveform. This is graphically demonstrated by the series of plots of FIGS. 7 and 8.

Figure 7:
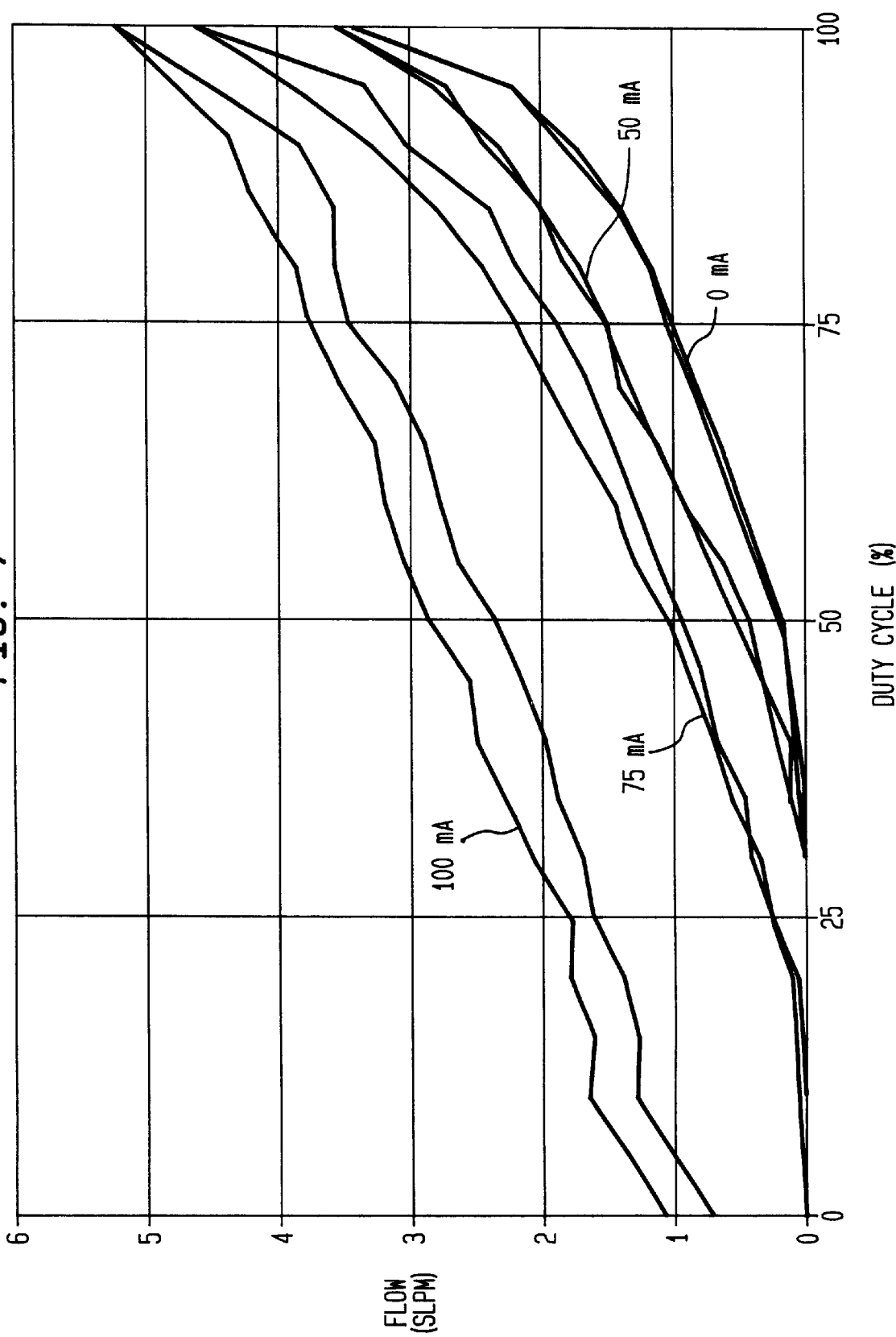
FIG. 7 is another series of graph plots useful in explaining the inventive principles in relation to FIG. 6.
Figure 8:
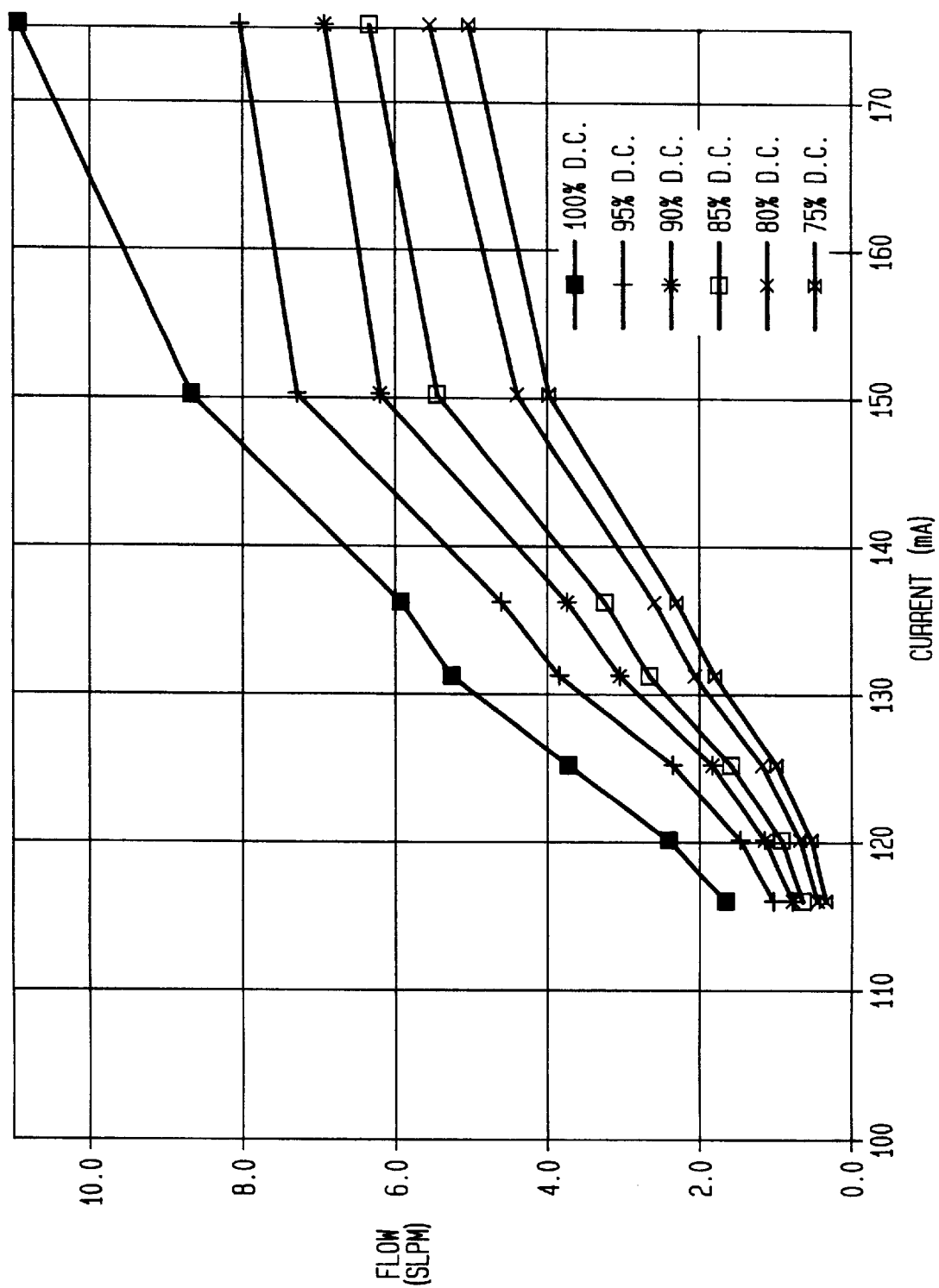
FIG. 8 is another series of graph plots useful in explaining the inventive principles in relation to FIG. 6.

The graph plots of FIGS. 7 and 8, show that if, at a given intake manifold vacuum (440 mm Hg in the examples), a certain SLPM fluid flow is caused by a certain average D.C. current in the solenoid due to the primary control circuit output waveform alone, this would correspond to the secondary control circuit output waveform having a 100% duty cycle. FIG. 7 shows six different plots for six different average solenoid currents. For each plot, as the duty cycle of the secondary control circuit output waveform progressively decreases from 100% while the primary control circuit output waveform remains unchanged, the flow through the valve will correspondingly decrease. FIG. 8 shows six different plots each corresponding to a particular duty cycle of the secondary control circuit output waveform. For each plot, as the duty cycle of the primary control circuit output waveform progressively decreases, the flow through the valve will correspondingly decrease.

From the scales of the graph plots of FIGS. 7 and 8, it can be appreciated that more accurate control can be achieved because of the resolution provided by modulating the duty cycle of the secondary control circuit output waveform from 100% to 0%, rather than attempting to control the valve by only the primary control circuit output waveform.

Figure 9:
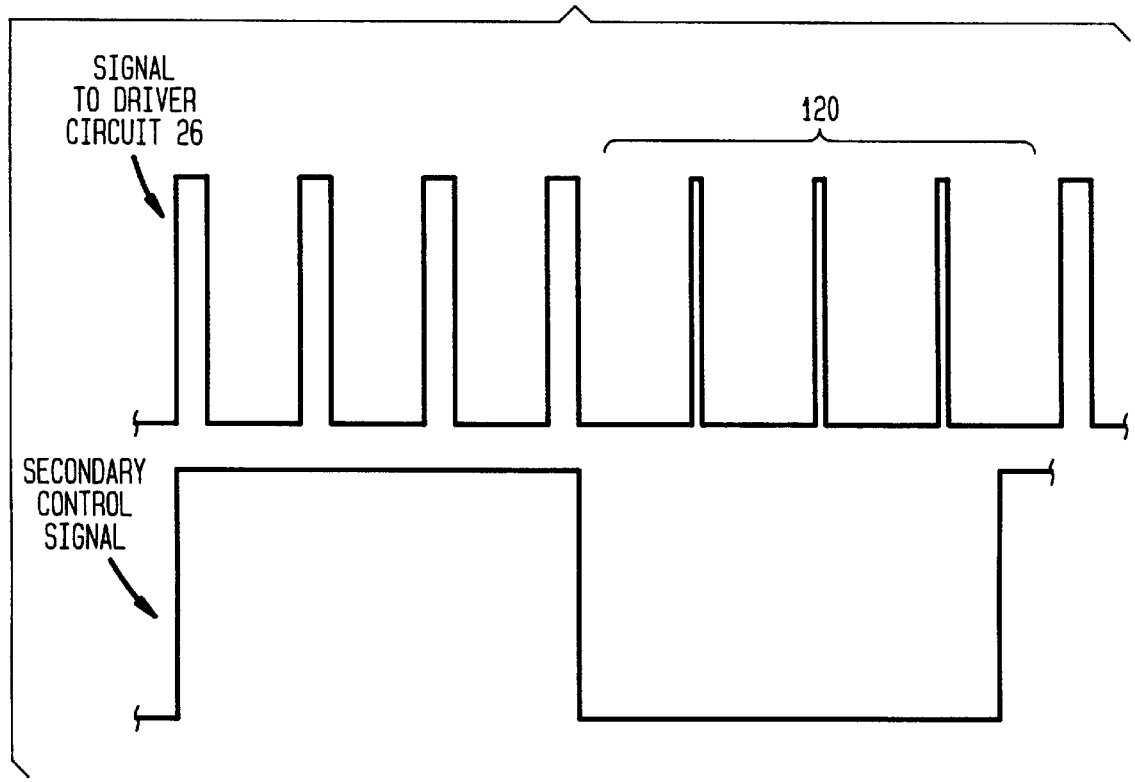
FIG. 9 is a waveform diagram useful in explaining a further aspect of the control strategy.

Generic principles of the invention are not necessarily limited to the specific manner of interaction of the secondary control signal with the primary control signal that been described with reference to FIG. 6. The inventive principles further contemplate that electric signals different from the primary control signal can be delivered to driver circuit 26 during times when the secondary control signal waveform is "low". An example of this is presented in FIG. 9 which shows that a pulse width modulated signal waveform 120 is being delivered to driver circuit 26 when the secondary control signal waveform is "low".

Figure 10:
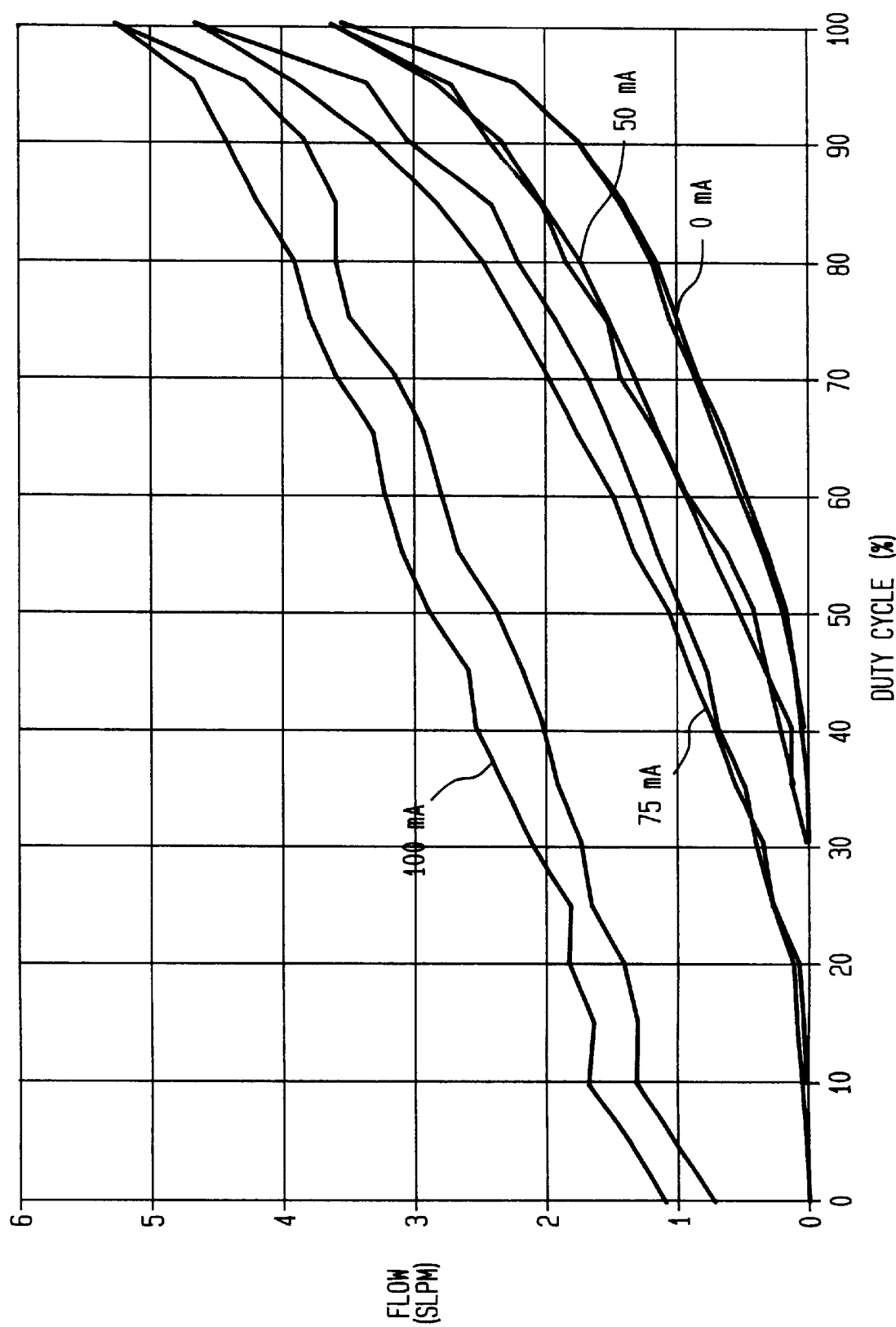
FIG. 10 is another series of graph plots useful in explaining the inventive principles in relation to FIGS. 6 and 9.

Three of the four plots of FIG. 10 show three flow rate vs. duty cycle of the secondary control output waveform for three different secondary pulse waveforms that create the respective average solenoid currents indicated in that FIG. The fourth plot is for no secondary pulse waveform, and corresponds to a zero secondary current portrayed by FIGS. 7 and 8. It can be seen that the use of a pulse waveform during the off time of the secondary control signal waveform may tend to introduce hysteresis into the plots, but this still provides improved accuracy over that obtainable with use of only a primary control signal.

Embodiments utilizing the inventive principles may be constructed in diverse ways. Because automotive electronic technology commonly employs various forms of electronic microcontrollers and/or processors, the development of an electric control signal may be accomplished by utilizing conventional software programming techniques to develop the desired waveform or waveforms for any specific control strategy embodying the inventive principles that is to be incorporated in any particular hardware configuration. The invention may be embodied in other forms of hardware, either by the inherent construction of other forms of hardware and/or by the software programming of other forms of hardware. One example of another form of hardware is an application specific integrated circuit (ASIC).

While the present invention has been described with reference to a preferred embodiment as currently contemplated, it should be understood that the invention is not intended to be limited to that embodiment. Accordingly, the invention is intended to encompass various modifications and arrangements that are within the scope of the claims.

What is claimed is:

1. An electric-operated device comprising:
   an electromechanical actuator that selectively positions a mechanism in accordance with an electric control signal comprising a waveform comprising voltage pulses; and
   a control, including a processor, for developing the electric control signal from a primary control signal and a secondary control signal, the primary control signal including a pulse width modulated voltage waveform;
   wherein the processor causes the secondary control signal to selectively interact with the primary control signal in developing the electric control signal such that whenever the mechanism is to be positioned within a first range of positions, the electric control signal is developed from the primary control signal alone, and whenever the mechanism is to be positioned within a second range of positions, the electric control signal is developed by interaction of the secondary control signal with the primary control signal.

2. A device set forth in claim 1 wherein the secondary control signal comprises a pulse width modulated voltage waveform.

3. A device set forth in claim 1 wherein the processor, whenever the mechanism is to be positioned within the first range, causes the electric control signal to comprise a pulse width modulated voltage waveform.

4. A device set forth in claim 3 wherein the processor, whenever the mechanism is to be positioned within second range, causes the electric control signal to comprise a voltage waveform comprising successively alternating intervals wherein a first interval contains a pulse width modulated voltage waveform corresponding to the primary control signal and a second interval does not contain that pulse width modulated voltage waveform.

5. A device set forth in claim 4 wherein the processor, whenever the mechanism is to be positioned within the second range, causes the electric control signal to comprise no voltage waveform during the second interval.

6. A device set forth in claim 5 wherein the processor, whenever the mechanism is to be positioned within the second range, causes the first intervals of the electric control signal to be of substantially the same duration as the second intervals.

7. A device set forth in claim 4 wherein the processor, whenever the mechanism is to be positioned within the second range, causes occurrences of the second interval of the electric control signal to comprise a voltage pulse waveform that is different from the pulse width modulated voltage waveform that the electric control signal comprises during occurrences of the first interval.

8. A device set forth in claim 7 wherein the processor, whenever the mechanism is to be positioned within the second range, causes the first intervals of the electric control signal to be of substantially the same duration as the second intervals.

9. A device set forth in claim 4 wherein the processor, whenever the mechanism is to be positioned within the second range, causes the voltage pulse waveform during occurrences of the second interval to comprise a pulse width modulated voltage waveform different from the pulse width modulated waveform during occurrences of the first interval.

10. A device set forth in claim 1 in which the control further includes a feedback compensation loop wherein the processor adjusts the electric control signal to compensate for environmentally induced variance in electric current that flows in response to application of the electric control signal to the actuator.

11. A device set forth in claim 1 in which the actuator comprises a linear solenoid actuator to which the electric control signal is applied.

12. In an electric-operated control device comprising a control mechanism that is positioned by an electric control signal to control an output of the device and that has a frequency response characteristic which renders the control mechanism capable of tracking the fundamental frequency of the electric control signal whose fundamental frequency is less than a first frequency, and which renders the control mechanism incapable of tracking the fundamental frequency of the electric control signal whose fundamental frequency is greater than a second frequency which is sufficiently greater than the first frequency that, when applied in control of the control mechanism, positions the control mechanism to a position corresponding to a most recent time average of electric control signal, the control mechanism also functionally relating the output of the device to the electric control signal such that the output of the device as a function of the electric control signal consisting of time-averaged electric D.C. current flow comprises a first range wherein a given incremental change in time-averaged electric D.C. current flow causes an incremental change in output within a first range of incremental output changes and a second range wherein the same given incremental change in time-averaged electric D.C. current flow causes an incremental change in output within a second range of incremental output changes comprising incremental output changes that are substantially amplified from those of the first range of incremental output changes, a device for effectively attenuating the incremental output changes of the second range which comprises:

a control, including a processor, for developing from a primary control signal and a secondary control signal, the electric control signal for controlling the control mechanism, the primary control signal including a pulse width modulated voltage waveform;

wherein the processor causes the secondary control signal to selectively interact with the primary control signal in developing the electric control signal such that whenever the output is to be within the first range, the electric control signal is developed from the primary control signal alone, and whenever the output is to be within the second range, the electric control signal is developed by interaction of the secondary control signal with the primary control signal.

13. The device set forth in claim 12 wherein the secondary control signal comprises a pulse width modulated voltage waveform.

14. The device set forth in claim 12 wherein the processor, whenever the output is to be within the first range, causes the electric control signal to comprise a pulse width modulated voltage waveform.

15. The device set forth in claim 14 wherein the processor, whenever the output is to be within the first range, causes the electric control signal to comprise a voltage waveform comprising successively alternating intervals wherein a first interval contains a pulse width modulated voltage waveform corresponding to the primary control signal and a second interval does not contain that pulse width modulated voltage waveform.

16. The device set forth in claim 15 wherein the processor, whenever the output is to be within the first range, causes the electric control signal to comprise no voltage waveform during occurrences of the second interval.

17. The device set forth in claim 16 wherein the processor, whenever the output is to be within the first range, causes the first intervals of the electric control signal to be of substantially the same duration as the second intervals.

18. The device set forth in claim 14 wherein the processor, whenever the output is to be within the first range, causes occurrences of the second interval of the electric control signal to comprise a voltage pulse waveform that is different from the pulse width modulated volage waveform that the electric control signal comprises during occurrences of the first interval.

19. The device set forth in claim 18 wherein the processor, whenever the output is to be within the first range, causes the first intervals of the electric control signal to be of substantially the same duration as the second intervals.

20. The device set forth in claim 14 wherein the processor, whenever the output is to be within the first range, causes the voltage pulse waveform during occurrences of the second interval to comprise a pulse width modulated voltage waveform different from the pulse width modulated voltage waveform during occurrences of the first interval.

21. The device set forth in claim 12 in which the control further includes a feedback compensation loop wherein the processor adjusts the electric control signal to compensate for environmentally induced variance in electric current that flows in response to application of the electric control signal to the device.

22. The device set forth in claim 12 in which the device comprises a linear solenoid actuator to which the electric control signal is applied.

23. A system of an automotive vehicle comprising:

an electric-operated device, including an electromechanical actuator, that controls an output of the system in accordance with an electric control signal comprising a waveform comprising voltage pulses applied to the actuator; and a control, including a processor, for developing the electric control signal from a primary control signal and a secondary control signal, the primary control signal including a pulse width modulated voltage waveform;

wherein the processor causes the secondary control signal to selectively interact with the primary control signal in developing the electric control signal such that whenever the output is to be within a first range, the electric control signal is developed from the primary control signal alone, and whenever the output is to be within a second range, the electric control signal is developed by interaction of the secondary control signal with the primary control signal.

24. A system set forth in claim 23 wherein the secondary control signal comprises a pulse width modulated voltage waveform.

25. A system set forth in claim 23 wherein the processor, whenever the output is to be within the first range, causes the electric control signal to comprise a pulse width modulated voltage waveform.

26. A system set forth in claim 25 wherein the processor, whenever the output is to be within the first range, causes the electric control signal to comprise a voltage waveform comprising successively alternating intervals wherein a first interval contains a pulse width modulated voltage waveform corresponding to the primary control signal and a second interval does not contain that pulse width modulated voltage waveform.

27. A system set forth in claim 26 wherein the processor, whenever the output is to be within the first range, causes the electric control signal to comprise no voltage waveform during the second interval.

28. A system set forth in claim 27 wherein the processor, whenever the output is to be within the first range, causes the first intervals of the electric control signal to be of substantially the same duration as the second intervals.

29. A system set forth in claim 26 wherein the processor, whenever the output is to be within the first range, causes occurrences of the second interval of the electric control signal to comprise a voltage pulse waveform that is different from the pulse width modulated voltage waveform that the electric control signal comprises during occurrences of the first interval.

30. A system set forth in claim 29 wherein the processor, whenever the output is to be within the first range, causes the first intervals of the electric control signal to be of substantially the same duration as the second intervals.

31. A system set forth in claim 26 wherein the processor, whenever the output is to be within the first range, causes the voltage pulse waveform during occurrences of the second interval to comprise a pulse width modulated voltage waveform different from the pulse width modulated voltage waveform during occurrences of the first interval.

32. A system set forth in claim 23 in which the control further includes a feedback compensation loop wherein the processor adjusts the electric control signal to compensate for environmentally induced variance in electric current that flows in response to application of the electric control signal to the actuator.

33. A system set forth in claim 23 in which the actuator comprises a linear solenoid actuator to which the electric control signal is applied.

34. A system as set forth in claim 23 wherein the system is an emission control system and the device comprises a valve.

35. A control for controlling an output of a system of an automotive vehicle comprising:

an electric-operated control device that controls the output of a system of an automotive vehicle in accordance with an electric control signal comprising a waveform comprising voltage pulses applied to the device; and an electric control, including a processor, for developing the electric control signal from a primary control signal and a secondary control signal, the primary control signal including a pulse width modulated voltage waveform;

wherein the processor causes the secondary control signal to selectively interact with the primary control signal in developing the electric control signal such that at certain times, the electric control signal is developed from the primary control signal alone, and at certain other times, the electric control signal is developed by interaction of the secondary control signal with the primary control signal.

* * * * *